United States Patent

Dreer et al.

[11] Patent Number: 5,868,810
[45] Date of Patent: Feb. 9, 1999

[54] FILTERING CARTRIDGE

[75] Inventors: Norbert Dreer, Höfen; Robert Grill; Silvia Kremshofer, both of Reutte, all of Austria

[73] Assignee: Schwarzkopf Technologies Corporation, New York, N.Y.

[21] Appl. No.: 923,760

[22] Filed: Sep. 2, 1997

[30] Foreign Application Priority Data

Sep. 10, 1996 [AT] Austria ............................... GM 526/96

[51] Int. Cl.⁶ ............................... B01D 39/20; C22C 1/08
[52] U.S. Cl. ............................... 55/487; 55/523; 55/525; 55/DIG. 5; 427/244; 427/247
[58] Field of Search ............................ 55/486, 487, 523, 55/525, 526, DIG. 5; 210/510.1; 427/244, 243, 247

[56] References Cited

U.S. PATENT DOCUMENTS

| 2,554,343 | 5/1951 | Pall ........................................... 55/523 |
| 2,768,144 | 10/1956 | Sundback ................................. 55/523 |
| 3,087,233 | 4/1963 | Turnbull ................................... 55/523 |
| 3,896,028 | 7/1975 | Phillips, Jr. ............................. 210/152 |
| 3,965,010 | 6/1976 | Phillips, Jr. et al. ................... 210/283 |
| 4,681,624 | 7/1987 | DeAngelis et al. ......................... 75/28 |
| 4,758,272 | 7/1988 | Pierotti et al. ............................ 55/523 |
| 5,302,181 | 4/1994 | Morichika et al. ....................... 75/245 |
| 5,378,426 | 1/1995 | Geibel et al. ............................... 419/2 |
| 5,468,273 | 11/1995 | Pevzner et al. ........................... 55/523 |
| 5,505,757 | 4/1996 | Ishii .......................................... 55/523 |
| 5,672,387 | 9/1997 | Tsubouchi et al. ...................... 427/253 |
| 5,716,429 | 2/1998 | Van Wijck et al. ....................... 55/523 |
| 5,747,112 | 5/1998 | Tsubouchi et al. ...................... 427/253 |

FOREIGN PATENT DOCUMENTS

| 0 510 495 A | 10/1992 | European Pat. Off. . |
| 0 639 398 A1 | 2/1995 | European Pat. Off. . |
| 0 696 649 A1 | 2/1996 | European Pat. Off. . |
| 24 56 626 B2 | 6/1975 | Germany . |
| 32 03 712 A1 | 8/1982 | Germany . |
| 36 13 697 A1 | 11/1986 | Germany . |
| 43 35 606 A1 | 4/1994 | Germany . |
| 63-72319 | 4/1988 | Japan ....................................... 55/523 |
| 2-175803 | 7/1990 | Japan ....................................... 55/523 |

*Primary Examiner*—Duane S. Smith
*Attorney, Agent, or Firm*—Morgan & Finnegan, L.L.P.

[57] ABSTRACT

A filtering cartridge made of compacted and sintered particles is manufactured from a powder consisting of chromium or a chromium alloy with at least 70% Cr by weight and a particle size of the chromium particles between 160 $\mu$m and 500 $\mu$m. Filtering cartridges of this type can be used advantageously, particularly in gas clarification for energy production by biomass gasification or coal gasification, in cracking processes in the petroleum industry, as well as for the production of melamine resin.

8 Claims, No Drawings

FILTERING CARTRIDGE

BACKGROUND OF THE INVENTION

1. Field of the Invention

The present invention relates to filters, and more particularly to a filtering cartridge with a porous body of compacted and sintered noncorroding particles.

2. Description of the Related Art

In general, these types of filtering cartridges have a uniform pore structure and are utilized to filter out undesired particles from a liquid or gas. The undesired dispersed particles in the medium to be filtered arrive at the individual grains of the filtering cartridge through different transport mechanisms, such as screening effects, inertial forces, diffusion and electrostatic forces, while the remainder of the medium passes through the filtering cartridge. If the pores of the filtering cartridge are clogged by the filtrate, then the filtering cartridge is no longer operative and must be cleaned. As a rule, this cleaning is performed by reverse impulses in a counterflow of the medium.

Filtering cartridges must often be employed at high temperatures and for offensive media. For example, temperatures up to 1000° C. can appear in dust extraction from hot process and exhaust gases. The filtering cartridges must therefore be resistant to both high temperatures and corrosion. In spite of the porosity necessary for the filter effect, the filtering cartridges must simultaneously have sufficient mechanical toughness in order to be easy to handle and, above all, to withstand without damage the mechanical stresses which occur from the shock-like reverse impulses for cleaning the filtering cartridge.

Currently, self-supporting filtering cartridges are used for high-performance extraction of dust from hot gases, mostly as a one-sided hollow cylinder, as a so-called candle made of ceramic material. Filtering cartridges of this type have excellent corrosion resistance and temperature resistance, but are indeed not well suited with regard to shock-like mechanical stress, so that a premature failure of filtering cartridges of this type often occurs from reverse impulses during the filter's mandatory cleaning.

Known metallic filtering cartridges indeed have a sufficient amount of the required mechanical toughness, but can no longer be satisfactorily used, especially for particularly offensive media and at high temperatures.

By way of example, DE-B2 24 56 626 describes a filtering cartridge made of an alloy with 30–40% chromium by weight, 2–4% silicon by weight and, except for small amounts of carbon and nitrogen, with iron as the remainder. Such a filtering cartridge is primarily used for polymerization liquefaction at temperatures of approximately 300° C. and is only suitable to a limited extent for offensive media and higher temperatures.

Chromium is known as a metal with excellent corrosion resistance, even at high temperatures. Furthermore, it is also well known that pure chromium or alloys with a large chromium content normally are very brittle, and therefore do not fulfill the mechanical demands which are placed on filtering cartridges.

The alloy corresponding to DE-B2 24 56 626 is therefore limited to a maximum chromium content of 40% by weight, and no other filtering cartridges with a larger chromium content are known to be in practical operation.

SUMMARY OF THE INVENTION

An object of the present invention is to create a filtering cartridge which can be used without problem with the highest corrosion resistance, even at temperatures of 1000° C., and which has adequate mechanical toughness at the same time in order to survive the large shock stresses which appear during filter cleaning over a long time period without damage.

In accordance with the present invention, this and other objects and advantages will be attained by manufacturing the filtering cartridge from a powder of pure chromium or a chromium alloy with a portion of at least 70% chromium by weight, and a particle size of the chromium particles between 160 $\mu$m and 500 $\mu$m.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

DESCRIPTION OF THE PREFERRED EMBODIMENTS

In accordance with the present invention, a filtering cartridge is manufactured from a powder of pure chromium or a chromium alloy with a portion of at least 70% chromium by weight, and a particle size of the chromium particles between 160 $\mu$m and 500 $\mu$m.

It turns out that filtering cartridges of suitable porosity in the range between 20% and 30% and with satisfactory values regarding the mechanical characteristics can be manufactured by using an entire particular grain size fraction in the range between 160 $\mu$m and 500 $\mu$m for the chromium powder, independent of the usual compacting pressures and sintering conditions applied during manufacture. It was by no means to be expected that such good mechanical characteristics were to be obtained with brittle chromium just by use of a course grain particle fraction of such a type in accordance with the present invention, because it is well known from the powder metallurgy of refractory metals, to which chromium belongs, that sintered compact of fine powders with grain size fractions below approximately 40 $\mu$m have the best mechanical characteristics. The specialist would exclude such a type of fine grain size fraction for the manufacture of porous filtering cartridges out of hand, on the basis of the large pressure drop appearing during filtration.

Particle sizes between 200 $\mu$m and 300 $\mu$m have proven to be a particularly advantageous grain size region for the chromium output powder in accordance with the present invention.

When a chromium alloy, rather than pure chromium is used for the filtering cartridge in accordance with the present invention, then chromium alloys, in particular those which contain one or more metals from the group Fe, Co, Ni, and Cu and/or one or more oxides of the metals from the group Cr, Zr, Hf, Y and the rare earths, have proven successful.

A particularly advantageous variation of the filtering cartridge is attained in accordance with the present invention when the filtering cartridge has a coating manufactured from a powder of chromium or a chromium alloy with a grain size of less than 40 $\mu$m, on the surface turned toward the unfiltered medium.

A special surface filter effect is attained in this way. The filtering cartridge remains operative for a particularly long functional span, since the course pores located under the thin fine-pore surface layer no longer clog. Because of this surface filter effect, the filtering cartridge can be cleaned more easily and more thoroughly by a reverse impulse than filtering cartridges without this surface layer. The sufficient mechanical toughness for the filter is nevertheless ensured by the support of the surface layer by the parent substance, which is manufactured from powders with a particle size between 160 $\mu$m and 500 $\mu$m.

It has proven particularly successful, if the coating has a thickness between 100 $\mu$m and 200 $\mu$m and is deposited by slip-coating.

Filtering cartridges in accordance with the invention, for example, are advantageously used in gas clarification for energy production by biomass gasification or coal gasification, where they are exposed to reducing atmospheres between 600° C. and 800° C., or by the petroleum industry in cracking processes for catalyst recovery, likewise with reducing atmospheres between 600° C. and 800° C., or for the manufacture of melamine for catalyst recovery in strongly nitrifying atmospheres at temperatures around 400° C.

The invention will be explained in more detail in the following examples.

EXAMPLE 1

Chromium powder with a particle size distribution between 200 $\mu$m and 300 $\mu$m uniaxial was sintered under pressure with a compacting pressure of 2.2 t/cm$^2$ in the matrix for the manufacture of round-shaped filtering cartridges with 150 mm Ø and 6 mm thickness for the cross current filter. The green compacts were sintered 2 hours under hydrogen at 1400° C. The sintered compacts were finally brought to the desired final size by mechanical processing. The filtering cartridges manufactured in this way had a porosity of 30% and a pore size distribution of 20–200 $\mu$m. A portion of these filtering cartridges were finally covered on the surface by coating with an aqueous suspension of chromium powder with a particle size distribution of 1 $\mu$m to 10 $\mu$m, and were subjected to an additional sintering treatment over 2 hours under hydrogen at 1400° C. The surface layer deposited like this had a thickness of 100 $\mu$m, a porosity of 20% and a pore size distribution of 10 $\mu$m to 50 $\mu$m.

EXAMPLE 2

Pure chromium powder with a particle size distribution between 160 $\mu$m and 500 $\mu$m was compacted by cold isostatic pressing with a compacting pressure of 2100 bar, for the manufacture of self-supporting candles in the shape of one-sided closed tubes with an outer diameter of 57 mm, an inner diameter of 47 mm and a length of 1000 mm. The compacting took contraction of the desired tubes which appears during sintering into consideration.

Subsequently, the green compacts were sintered under hydrogen over 2 hours at 1450° C. Mechanical finishing for these filtering cartridges could be dispensed with. Filtering cartridges manufactured in this way had a porosity of 31% and a pore size distribution of 20 $\mu$m to 200 $\mu$m.

EXAMPLE 3

For purposes of comparison, filtering cartridges were manufactured as in Example 1, but with a particle size distribution of 10 $\mu$m to 125 $\mu$m and without a surface coating. Filtering cartridges manufactured like this had a porosity of 25% and a pore size distribution of 30 $\mu$m to 80 $\mu$m.

EXAMPLE 4

Filtering cartridges were manufactured as in Example 1, likewise for comparison purposes, but with a particle size distribution of 550 $\mu$m to 1000 $\mu$m and without a surface coating. The filtering cartridges so manufactured had a porosity of 23% and a pore size distribution of 50 $\mu$m to 300 $\mu$m.

The filtering cartridges manufactured according to Examples 1 through 4 were subjected to a pressure experiment. For this purpose, test bodies in the shape of an O-ring (short section of the tube) were separated and test bodies of this type were also worked out of the round-shaped filtering cartridges. After that, the test bodies were loaded to the breaking point between two pressure plates on a universal test machine.

The pressure experiment proved that the filtering cartridges manufactured in accordance with the present invention according to Examples 1 and 2 had an average fracture strength between 35 N/mm$^2$ and 40 N/mm$^2$, whereas the filtering cartridges manufactured for comparison according to Example 3 had an average fracture strength between 8 N/mm$^2$ and 10 N/mm$^2$, and the filtering cartridges manufactured according to Example 4 had an average fracture strength between 12 N/mm$^2$ and 15 N/mm$^2$.

It is clearly recognized that a completely unexpected, distinct improvement of the mechanical toughness was attained by the region of particle size distribution which is in accordance with the invention.

The filtering cartridges manufactured in accordance with the invention were employed for filtration of hot gases in melamine resin production under strongly nitrifying conditions at temperatures around 400° C. No corrosive and mechanical damage to the filtering cartridges could be determined after 2 months of operation with 10 minute cleaning cycles in the air counterflow.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A filtering cartridge for filtering particulate from a medium, the cartridge comprising a porous body of compacted and sintered noncorroding particles, wherein said porous body is manufactured from a powder consisting of chromium or a chromium alloy with at least 70% Cr by weight and a particle size of the chromium particles between 160 $\mu$m and 500 $\mu$m, wherein the cartridge has a coating on a surface thereof turned toward the medium to be filtered, the coating manufactured from a powder consisting of chromium or a chromium alloy with a grain size of less than 40 $\mu$m.

2. The filtering cartridge according to claim 1, wherein said powder has a particle size between 200 $\mu$m and 300 $\mu$m.

3. The filtering cartridge according to claim 1, wherein said chromium alloy contains one or more metals from the group Fe, Co, Ni and Cu and/or one or more oxides of the metals from the group Cr, Zr, Hf, Y and the rare earths.

4. The filtering cartridge according to claim 1, wherein said coating has a layer which is between 100 μm and 200 μm thick and is deposited by slip-coating.

5. A method for manufacturing a filtering cartridge comprising a porous body of compacted and sintered noncorroding particles for filtering particulate from a medium, comprising the steps of manufacturing the cartridge from a powder consisting of chromium or a chromium alloy with at least 70% Cr by weight and a particle size of the chromium particles between 160 μm and 500 μm and applying a coating to a surface of the cartridge turned toward the medium to be filtered, the coating manufactured from a powder consisting of chromium or a chromium alloy with a grain size of less than 40 μm.

6. The method according to claim 5, wherein said powder has a particle size between 200 μm and 300 μm.

7. The method according to claim 5, wherein said chromium alloy contains one or more metals from the group Fe, Co, Ni and Cu and/or one or more oxides of the metals from the group Cr, Zr, Hf, Y and the rare earths.

8. The method according to claim 5, wherein said coating has a layer which is between 100 μm and 200 μm thick and is deposited by slip-coating.

* * * * *